United States Patent
Lucht et al.

(10) Patent No.: US 9,415,747 B2
(45) Date of Patent: *Aug. 16, 2016

(54) BELT TIGHTENING DRIVE

(71) Applicant: IMS GEAR GMBH, Donaueschingen (DE)

(72) Inventors: Andreas Lucht, Horst (DE); Matthias Koop, Donaueschingen (DE); Patrick Suellau, Henstedt-Ulzburg (DE)

(73) Assignee: IMS Gear GmbH, Donaueschingen (DE)

( * ) Notice: Subject to any disclaimer, the term of this patent is extended or adjusted under 35 U.S.C. 154(b) by 114 days.

This patent is subject to a terminal disclaimer.

(21) Appl. No.: 14/219,221

(22) Filed: Mar. 19, 2014

(65) Prior Publication Data
US 2014/0312155 A1    Oct. 23, 2014

(30) Foreign Application Priority Data
Mar. 25, 2013  (DE) .......... 10 2013 205 246

(51) Int. Cl.
B60R 22/46    (2006.01)
(52) U.S. Cl.
CPC .......... *B60R 22/46* (2013.01); *B60R 2022/468* (2013.01); *B60R 2022/4666* (2013.01)
(58) Field of Classification Search
CPC .......... B60R 22/46; B60R 2022/4666

USPC .............................. 242/390.8, 374
See application file for complete search history.

(56) References Cited

U.S. PATENT DOCUMENTS

| | | | | | |
|---|---|---|---|---|---|
| 5,295,730 | A | * | 3/1994 | Rees | 297/361.1 |
| 5,605,071 | A | * | 2/1997 | Buchanan, Jr. | 74/425 |
| 9,145,107 | B2 | * | 9/2015 | Lucht | B60R 22/46 |
| 2013/0334356 | A1 | * | 12/2013 | Lucht et al. | 242/390.8 |

FOREIGN PATENT DOCUMENTS

DE    10 2008 048339 A1    5/2010

* cited by examiner

*Primary Examiner* — Sang Kim
(74) *Attorney, Agent, or Firm* — Juneau & Mitchell

(57) ABSTRACT

The invention is a belt tightening drive for tightening a seat belt that can be wound about a winding shaft, comprising a spindle shaft driven by a drive unit and a worm drive with a worm supported in a torque-proof fashion on the spindle shaft and a driven wheel, engaged therewith and supported in a torque-proof fashion on the winding shaft. According to the invention it is provided that the worm comprises a first toothed section with a first toothed geometry, wherein the first position of the worm the first toothed section engages the driven wheel, the worm comprises at least a first toothed section and following a second toothed section with a second toothed geometry, with the first and second toothed geometries being embodied differently.

16 Claims, 11 Drawing Sheets

BELT TIGHTENING DRIVE

CROSS REFERENCE TO RELATED APPLICATIONS

This patent application claims priority German Patent Application 10 2013 205 246.4, filed on Mar. 25, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The invention relates to a belt tightening drive for tightening a seat belt that can be wound about a winding shaft.

2. Background of the Invention

The current state of knowledge is as follows.

Such a reversible belt tightening drive is known for example from DE 10 2008 048 339 A1, in which an electric engine drives a spindle shaft via a first transmission, embodied as a toothed gear transmission, which in turn via a second transmission drives a driven wheel arranged in a torque-proof fashion on a winding shaft in order to wind up a seat belt. This second transmission is formed by a worm, arranged on a spindle shaft, and diagonal external teeth of the driven wheel.

A reversible belt tightening device is activated when needed, here for example in case of a minor crash or a threatened crash, during cross-country driving, or when strong decelerations occur from braking the vehicle, causing the seat belt to tighten. In order to maintain the tight status of the belt in such situations here an electric engine is supplied with high amperage, stressing the vehicle energy system to an undesired high extent.

In case of a crash the triggering of the belt tightening device occurs by way of pyrotechnics and represents a full load tightening, which leads to a decoupling of the belt tightening device from the electric engine. The subsequent holding of the seat belt via the electric drive by a residual current of the electric engine leads to it once more being coupled to the belt tightening device and here disruptions may occur regarding the limitation of force. This residual power supply of the electric engine also strains the vehicle energy system.

Additionally, highly dynamic load conditions occur during full load tightening. They lead to high torque (holding moments) in the driven step of the seat belt tightening device and thus to high gearing forces, particularly in case of a diagonal gearing of the toothed components used, and also to high axial forces, which cause a deformation of the toothed components, such as the wheel body and the bearing points inside the housing of the belt tightening device and thus they may lead to a loss of stability, and ultimately to damages and mechanic failure of the toothed parts.

The objective of the invention is to provide a belt tightening drive of the type mentioned at the outset in which high passive loads, which exceed the active tightening load of the belt tightening device, are compensated without here any risk for damages or failure of the toothed components arises and thus the capacity is at least not reduced. Further, rapid tightening shall be possible when the belt tightening device is triggered.

BRIEF SUMMARY OF THE INVENTION

In a preferred embodiment, a belt tightening drive for tightening a seat belt that can be wound about a winding shaft, comprising: a spindle shaft driven by a drive unit and a worm drive with a worm supported in a torque-proof fashion on the spindle shaft and a driven wheel engaged therewith and supported in a torque-proof fashion on the winding shaft, wherein, the worm comprises a first toothed section with a first toothed geometry, with in the first position of the worm the first toothed section engages the driven wheel, the worm comprises at least one second toothed section with a second toothed geometry following the first toothed section, with the first and the second toothed geometries being embodied differently, and depending on an axial force applied upon the worm, an axial displacement of the worm occurs between a first position, in which the worm engages the driven wheel via the first toothed section, and a second position, in which it engages the driven wheel via its second toothed section.

In another preferred embodiment, the belt tightening drive as described, wherein the worm is arranged on the spindle shaft in a displaceable fashion between the first position and the second position.

In another preferred embodiment, the belt tightening drive as described, further comprising wherein a spring element is provided, which pre-stresses the worm in the direction towards the first position.

In another preferred embodiment, the belt tightening drive as described, further comprising wherein an actuator is provided to generate the axial force applied upon the worm.

In another preferred embodiment, the belt tightening drive as described, wherein the actuator and the spring element are embodied such that the worm, depending on an axial force generated by the actuator, is displaced out of the first position into the second position against the spring force of the spring element.

In another preferred embodiment, the belt tightening drive as described, wherein the actuator is embodied as a motor unit with a toothed wheel and the worm comprises a contour of a toothed rack effectively connected to the toothed wheel.

In another preferred embodiment, the belt tightening drive as described, wherein the actuator is embodied as a magnetic system with a rocker switch pivotal between two switch positions, with in the activated magnetic system the rocker switch being effectively connected to the worm.

In another preferred embodiment, the belt tightening drive as described, wherein the axial force applied upon the worm is generated by a load acting upon the driven wheel, with here depending thereon a load acting at the driven wheel causes an axial displacement of the worm out of the first position into the second position against the spring force of the spring element.

In another preferred embodiment, the belt tightening drive as described, wherein the worm is embodied with a first and a second toothed geometry, in which the pitches show different values.

In another preferred embodiment, the belt tightening drive as described, wherein the second toothed geometry shows a lower pitch than the first toothed geometry.

In another preferred embodiment, the belt tightening drive as described, wherein the worm is embodied with a first and a second toothed geometry, in which the value of the pitch of the second toothed geometry represents an integral divisor of the value of the pitch of the first toothed geometry.

In another preferred embodiment, the belt tightening drive as described, wherein the worm is embodied with a first and a second toothed geometry, with here a continuous transition being provided between the first and the second toothed geometry.

In another preferred embodiment, the belt tightening drive as described, wherein the worm is embodied with a first and a second toothed geometry, with here the second toothed geometry being embodied with a larger tooth strength than the first toothed geometry.

In another preferred embodiment, the belt tightening drive as described, wherein the worm is embodied with a first and a second toothed geometry, with here the second toothed geometry, continuously increasing beginning with a tooth strength equivalent to the tooth strength of the first toothed geometry.

In another preferred embodiment, the belt tightening drive as described, wherein the toothed geometry of the driven wheel is embodied spherical.

In another preferred embodiment, the belt tightening drive as described, wherein the worm is embodied with a worm element comprising the first and the second toothed section arranged in a displaceable fashion on the spindle shaft, and a driven element, connected in a torque-proof fashion to the spindle shaft, with the worm element being rotationally coupled to the drive element and the spring element being arranged between the worm element and the drive element.

DETAILED DESCRIPTION OF THE INVENTION

Figure 1:
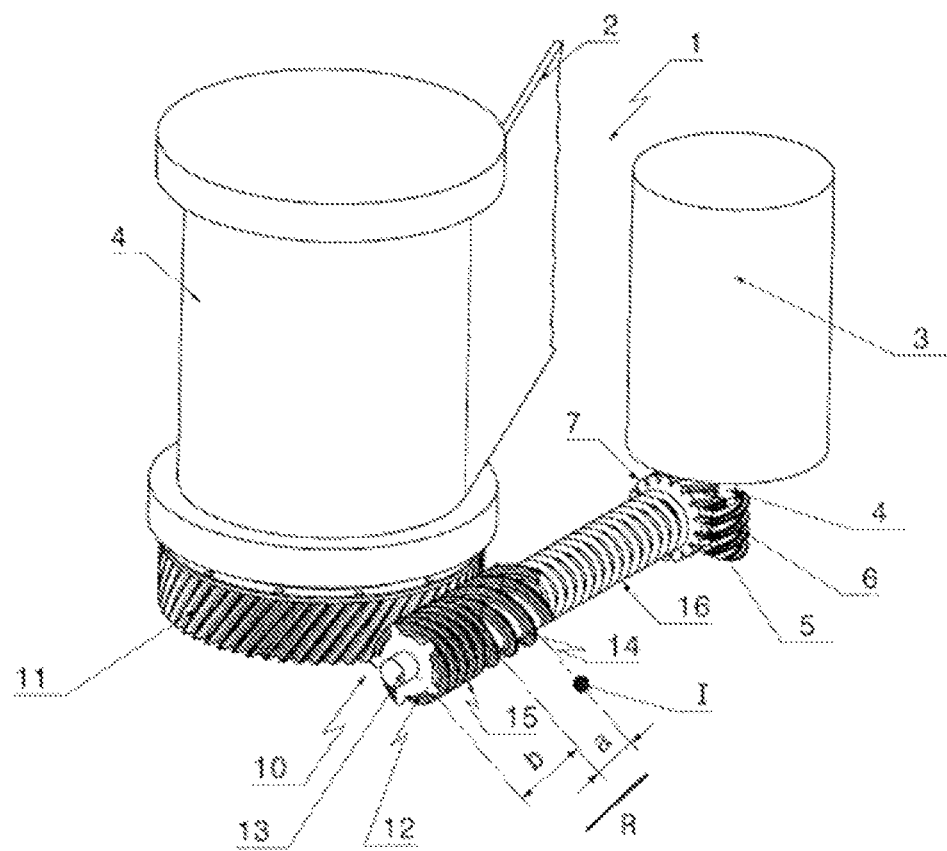
FIG. 1 is a schematic, perspective illustration of a belt tightening drive with a worm drive driven by an electric engine according to the invention.

The invention is a belt tightening drive for tightening a seat belt that can be wound about a winding shaft, comprising a spindle shaft driven by a drive unit and a worm drive which a worm supported in a torque-proof fashion on the spindle shaft and a driven wheel, engaged therewith and supported in a torque-proof fashion on the winding shaft, is characterized according to the invention such that:

the worm comprises a first toothed section with a first toothed geometry, with in the first position of the worm the first toothed section engages the driven wheel, the worm comprises at least a first toothed section and following thereto a second toothed section with a second toothed geometry, with the first and second toothed geometries being embodied differently, and depending on an axial introduction of force into the worm causes an axial displacement of the worm is caused between a first position, in which the worm engages the driven wheel via the first toothed section, and a second position engaging the driven wheel via its second toothed section.

By the embodiment of the worm according to the invention, depending on an axial force introduced into the worm, that toothed section of the worm with the corresponding toothed geometry is made to engage the driven wheel by an axial displacement of the torque-proof worm, with the toothed geometry here being embodied such that the desired effectiveness of the worm drive is achieved, thus in case of a low load a large effectiveness and in case of a high load at the driven wheel a low effectiveness develops.

For example, in the first position, being the normal position of the worm, the first toothed geometry may be selected such that a rapid transfer of torque is achieved for a rapid elimination of any belt slack with a low transfer of torque and subsequently, when the load increases at the driven wheel, by an axial displacement of the worm the second toothed geometry comes into an engagement with the driven wheel, which is selected such that in this position of the worm a low effectiveness can develop, connected with a high transfer of torque. This way, a high coupling force is achieved by the driven wheel so that any overload caused by this axial displacement of the worm is compensated. This way, the capacity of the belt tightening drive is considerably improved, with simultaneously the structural stability of the worm drive can be designed for the "normal" loads of passengers leaning forwards.

Here, the second toothed geometry of the worm, leading to a lower effectiveness, may be embodied such that the lower effectiveness leads to a self-blocking of the worm drive and thus a high load acting upon the driven wheel is held without any supply of counter-currents by the drive unit embodied as an electric engine.

According to one embodiment of the invention it is particularly advantageous when the worm is arranged on the spindle shaft in a displaceable fashion between the first position and the second position. This can lead to a simple design of the belt tightening device.

In another embodiment of the invention a spring element is provided, which pre-stresses the worm in the direction towards the first position. Here, only an introduction of force is required to displace the worm in the direction of the second position because by the spring force of the spring elements the worm can automatically be pushed back out of the second position into the first position.

In an advantageous fashion, according to another embodiment of the invention an actuator is provided for generating the introduction of the axial force into the worm, by which the displacement is caused between the first position and the second position. In case of a worm, pre-stressed by a spring element in the direction of the first position, this actuator only causes the displacement out of the first position into the second position, because in the inverse direction the worm is displaced back into the first position by the spring force of the spring element.

Such an actuator is preferably embodied as an engine unit with a toothed gear, with the worm showing the contour of a toothed rack engaging the toothed wheel. This way the worm can freely rotate, however in spite thereof it can be axially displaced by the toothed wheel engaging the contour of the toothed rack.

Alternatively, instead of a motor unit, here a magnetic system may be provided with a rocker switch pivotal between two switch positions, with in case of an activated magnetic system the rocker switch being in an effective connection to the worm. This way, when the magnetic system is subjected to electric power, the rocker switch is switched into a position in which the worm is being displaced. When a worm is pre-stressed in the direction of the first position by a spring element, the rocker switch only leads to this magnetic system causing a displacement out of the first position into the second position, because in the inverse direction the worm is pushed back into the first position by the spring force of the spring element.

In another embodiment of the invention the axial force introduced into the worm is generated by a load acting upon the driven wheel, with depending on the load acting upon the driven wheel the axial displacement of the worm out of the first position is caused into the second position against the spring force of the spring element.

With this embodiment of the invention the toothed section of the worm with the corresponding toothed geometry is automatically made to engage the driven wheel by way of an axial displacement of the torque-proof worm, depending on the operating state of the belt tightening drive determined by the load at the driven wheel and/or the worm, with here the toothed geometry can be embodied such that the desired effectiveness of the worm drive is achieved, thus upon an engagement with the first toothed geometry a high rotation and thus a rapid tightening of the seat belt is achieved.

In another advantageous embodiment of the invention the worm is embodied with a first and a second toothed geometry, in which the pitches may show different values. Advantageously the second toothed geometry shows a lower pitch than the first toothed geometry.

This leads in a first position of the worm, at low loads, the first toothed geometry engaging the driven wheel at a lower transmission than in a position of the worm, axially displaced by an increased load, in which the second toothed geometry engages the driven wheel. This means in the first position of the worm a higher rotation at the driven side compared to the rotation in the displaced position. This way a load-dependent change of the transmission is achieved with a corresponding change of the effectiveness.

It is particularly advantageous when here, according to a further development, the worm is embodied with a first and a second toothed geometry, in which the value of the pitch of the second toothed geometry represents an integral divisor, preferably ½ of the value of the pitch of the first toothed geometry. By the value ½, here the transmission, when engaging the first toothed geometry of the worm with the driven wheel, being twice the size compared to an engagement of the second toothed geometry with the driven wheel.

Furthermore it is possible to continuously lower the pitch of the second toothed geometry via the second toothed section such that with an increasing axial displacement of the worm a self-blocking of the worm drive is achieved in this second toothed section.

In another embodiment of the invention the worm is embodied with a first and a second toothed geometry, with a continuous transition being provided between the first and the second toothed geometry. This way any disruptions in the engagement of the gears in the transitional area shall be reduced between the first and the second toothed section.

In order to realize different toothed geometries, according to another advantageous embodiment of the invention, it is suggested for the worm to be embodied with a first and a second toothed geometry, in which the second toothed geometry shows a higher tooth strength than the first toothed geometry. This way, with increasing load at the driven wheel, an effective clamped connection is generated between the driven wheel and the worm and thus the torque can be increased, which can be introduced by the driven wheel.

In another embodiment of the invention the worm is embodied with a first and a second toothed geometry, in which the second toothed geometry continuously increases starting with a tooth strength equivalent to the tooth strength of the first toothed geometry. This way, based on the tooth width increasing with increase load at the driven wheel, the corresponding clamping between the participating teeth also increases, so that the torque to be compensated also increases. This may also lead to a self-blocking of the worm drive.

Further, according to another embodiment of the invention the toothed geometry of the driven wheel is embodied in a spherical fashion. This way, any disruptions of engagement are minimized by the changing toothed geometry of the worm, particularly in changing pitches.

Finally, according to a last preferred embodiment of the invention, the worm is embodied with a worm element, arranged in a displaceable fashion on the spindle shaft and comprising the first and second toothed section, and a drive element connected in a torque-proof fashion to the spindle shaft, with the worm element being rotationally coupled to the drive element and the spring element is arranged between the worm element and the drive element. This leads, together with the spindle shaft, to a simply designed construction of the worm.

DETAILED DESCRIPTION OF THE FIGURES

The belt tightening drive 1 according to FIG. 1 is only shown with its parts essential for understanding the invention and comprises an electric engine 3 as a drive unit, with its engine shaft 4 being coupled via a transmission 5 to a spindle shaft 13 of the worm drive 10, in order to drive a winding shaft 4 for tightening, thus winding up the seat belt 2. The transmission 5 is embodied as a worm drive with a worm 6 arranged in a torque-proof fashion at the motor shaft 4 of the electric engine 3 and a corresponding worm wheel 7, mounted fixed on the spindle shaft 13 of the worm drive 10. A housing of the belt tightening drive 1 is not shown in FIG. 1.

The worm drive 10 according to the invention comprises a worm 12 arranged on the spindle shaft 13 in a displaceable fashion in the direction R against the spring force of a spring element 16, as well as a driven wheel 11 engaging it, which shows diagonal external teeth. This driven wheel 11 is connected to the winding shaft 1 via a clutch (not shown). The spring element 16 is also arranged on the spindle shaft 13.

The worm 12 comprises two serially arranged toothed sections a and b with different tooth geometries, a first toothed section a with a first tooth geometry 14 and a second tooth section b with a second tooth geometry 15.

Figure 2:
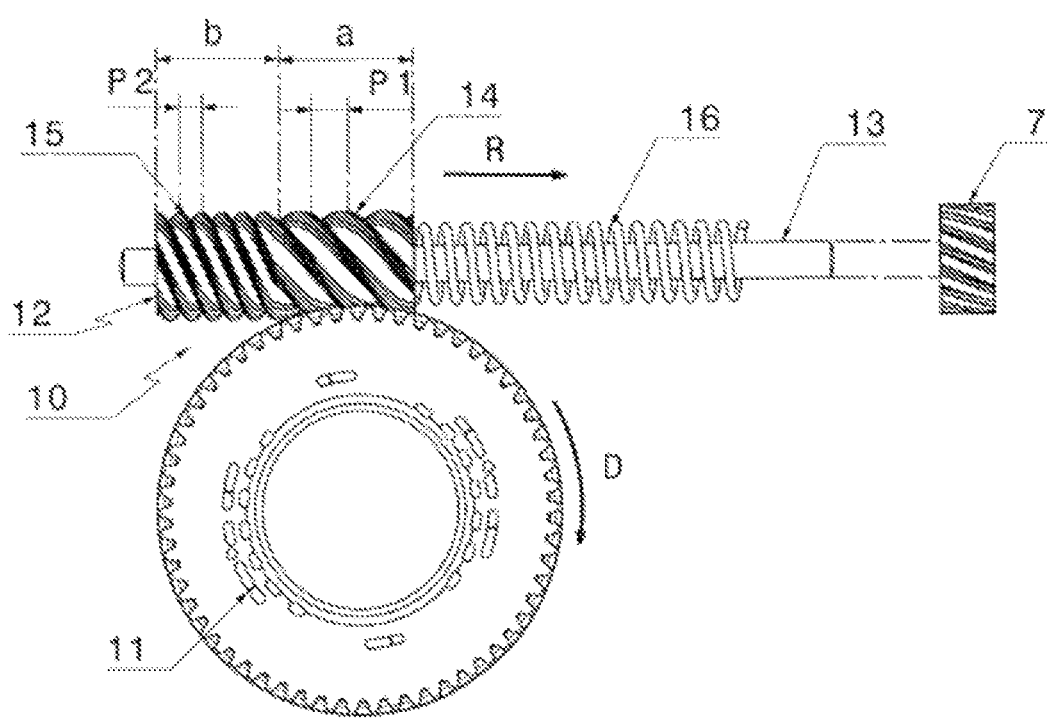
FIG. 2 is a schematic illustration of a worm drive of a belt tightening drive according to FIG. 1 in a first engaged position of the worm with a driven wheel according to a first exemplary embodiment.
Figure 3:
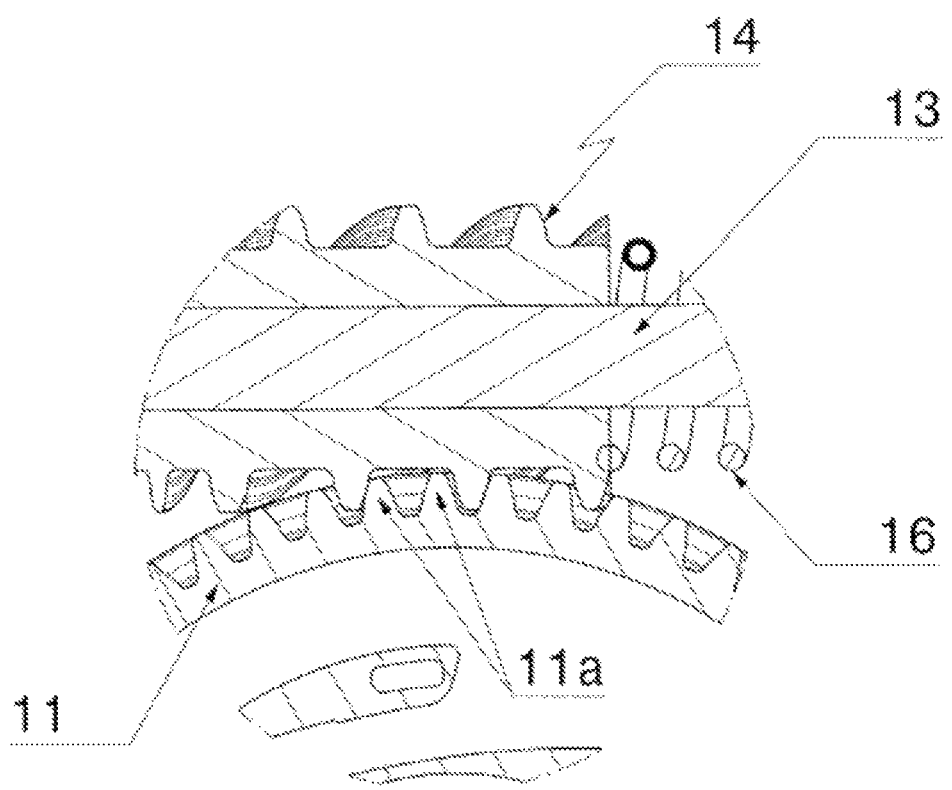
FIG. 3 is a detailed illustration of the engagement area between the worm and the driven wheel according to FIG. 2.

According to FIG. 1 the driven wheel 11 engages the first toothed geometry 14 and thus forms a first position I of the worm 12. FIG. 2 shows this first position I of the worm 12 on the spindle 13 in a side view and FIG. 3 shows in a detailed view the engagement sections between the first toothed geometry 14 and the teeth of the driven wheel 11.

The two toothed sections a and b show different tooth geometries 14 and 15, which differ in their respective pitch P. Here, the pitch $P_1$ of the first toothed geometry 14 of the first toothed section a is twice the size of the pitch $P_2$ of the second toothed geometry 15 of the second toothed section b of the worm 12. It also applies $P_2=(\frac{1}{2})P_2$.

In this position I of the worm 12 the engagement of the first toothed geometry 14 with the teeth of the driven wheel 11 occurs at low loads. This position I of the worm 12 represents their normal position, in which by an appropriate drive of the electric engine 3 a quick reduction of the belt slack of the seat belt 2 can be achieved via a rapid transmission of torque.

According to increasing load at the end of the process of a reduction of belt slack the driven wheel 11 is impinged with a force in the direction of the direction indicator D such that this way a displacement of the worm 12 is caused in the direction R opposite the spring force of the spring element 16. By this axial displacement of the worm 12 on the spindle shaft 13 now the second toothed geometry 15 of the second toothed section b engages the teeth of the driven wheel 11, as shown in FIG. 4.

Figure 4:
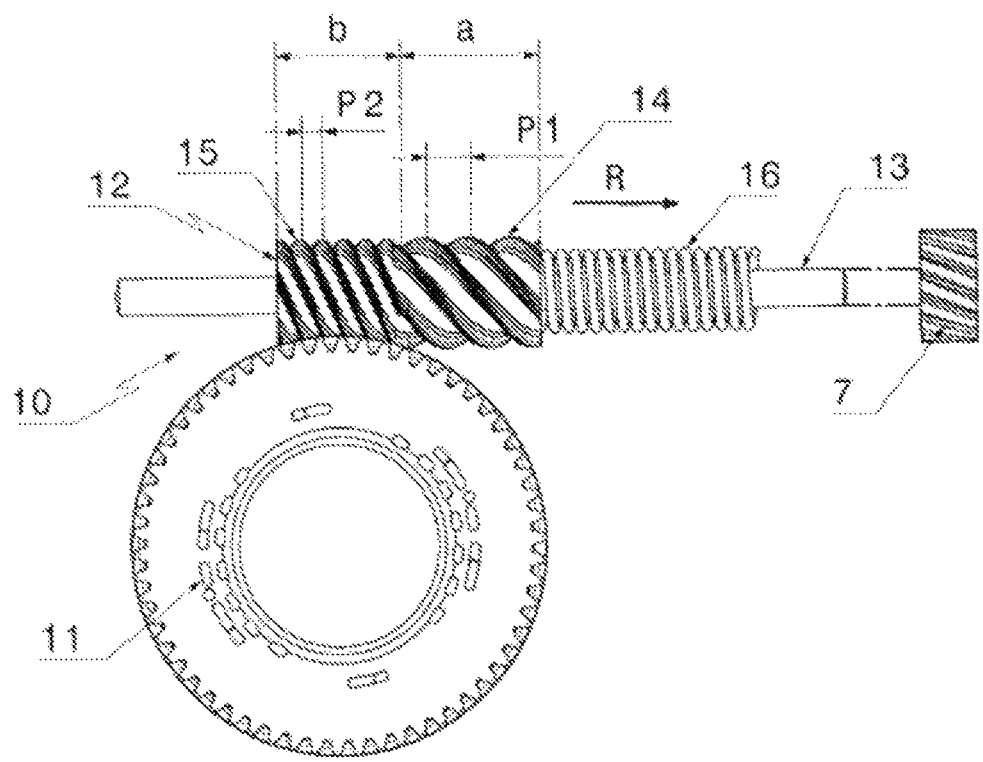
FIG. 4 is a schematic illustration of the worm drive of the belt tightening drive according to FIG. 2 in a second engaged position of the worm with the driven wheel.
Figure 5:
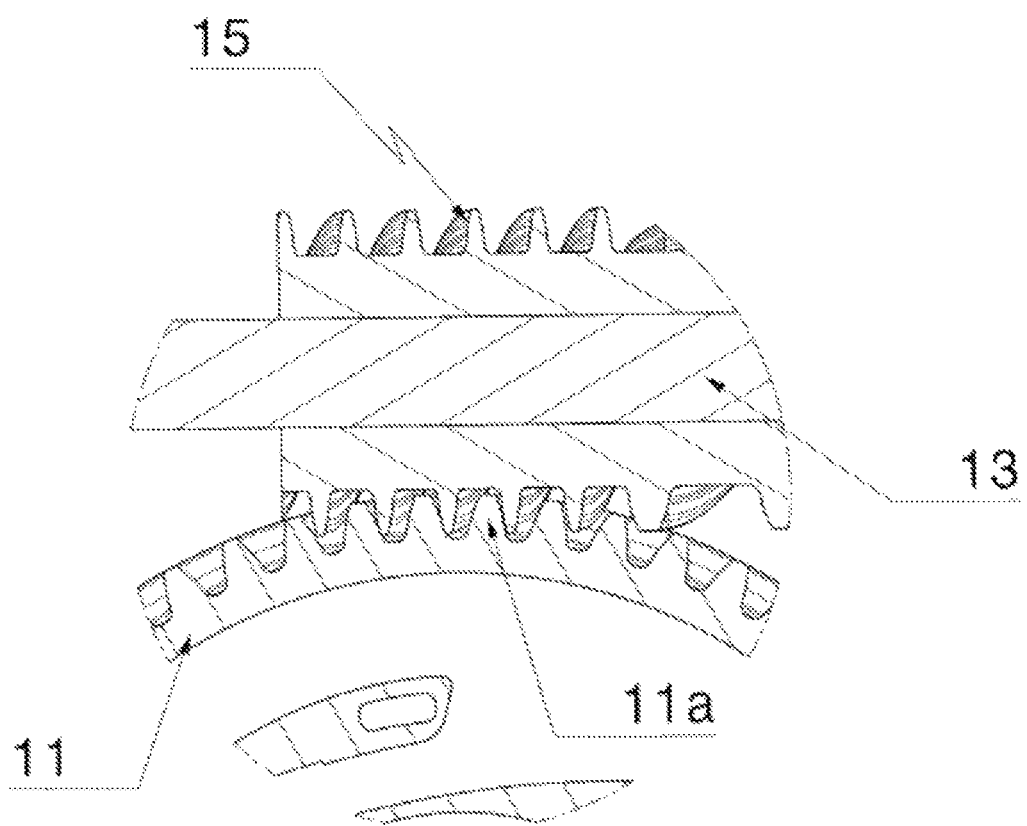
FIG. 5 is a schematic illustration of the worm drive of the belt tightening drive according to FIG. 4 in a second engaged position of the worm with the driven wheel.

Due to the fact that (in) the second toothed geometry 15, due to the pitch of the individual teeth 11a being halved in reference to the first toothed geometry 14, the teeth of the driven wheel 11 engage every tooth of the second toothed geometry 15 (cf. FIG. 5) and in the position I of the worm 12 two teeth 11a each of the toothed section of the driven wheel 11 engage one tooth of the first toothed geometry 14 (cf. FIG. 3), the transmission in the position of the worm 12 according to FIG. 4 is lower than in the position I of the worm 12 according to FIG. 2. Accordingly, in the position of the worm 12 according to FIG. 4 an engagement of the second toothed geometry 15 occurs under high load and with a large transmission.

The large transmission in reference to the position I is connected to a lower effectiveness, here achieving a high torque transfer by the driven wheel 11, while in the position I only a low torque can be transmitted. With this design of the two toothed geometries 14 and 15 a load-dependent transmission ratio is adjusted; particularly a dynamic adjustment of the transmission is possible from a rapid transmission of rotation with a low torque to a high torque with a high load at the driving wheel 11. Further, overloads at the driven wheel 11 are compensated by the axial displacement and/or deflection of the worm 12 such that the worm drive 10 can be produced with a transmission capacity designed for a "normal" load of a passenger leaning forward.

It is also possible to embody the second toothed geometry 15 such that its pitch angle $\alpha_2$, starting continuously at the transfer section to the first toothed section a, constantly increases with the value of the pitch angle $\alpha_1$ up to a final value. This final value can be selected such that in case of an engagement of the second toothed section 15, caused by an appropriate load-dependent displacement of the worm 12, at this end value of the pitch angle the driven wheel 11 can achieve a self-blocking of the worm drive 10. This way, the load causing the displacement can be held at the driven wheel 11 without the electric engine 3 providing a counter current. This can be used for permanent locking.

The axially displacing motion of the worm 12 is determined by a spring characteristic of the spring element 16. This way an additional spring element 16 as well as the two toothed geometries 14 and 15 can be adjusted to each other.

The gearing of the driven wheel 11 can be embodied spherically, in order to minimize any disruptions in engagement due to the changing pitch of the second toothed geometry 15 in reference to the first toothed geometry 14.

Distortions in the engagement between the toothed section of the driven wheel 11 and the first and second toothed geometry 14 and 15, particularly also in the transitional areas caused by different tooth geometries, can be intentionally permitted in order to this way obtain a desired reduction of the effectiveness, which leads to increased holding forces at the driven side.

Figure 6:
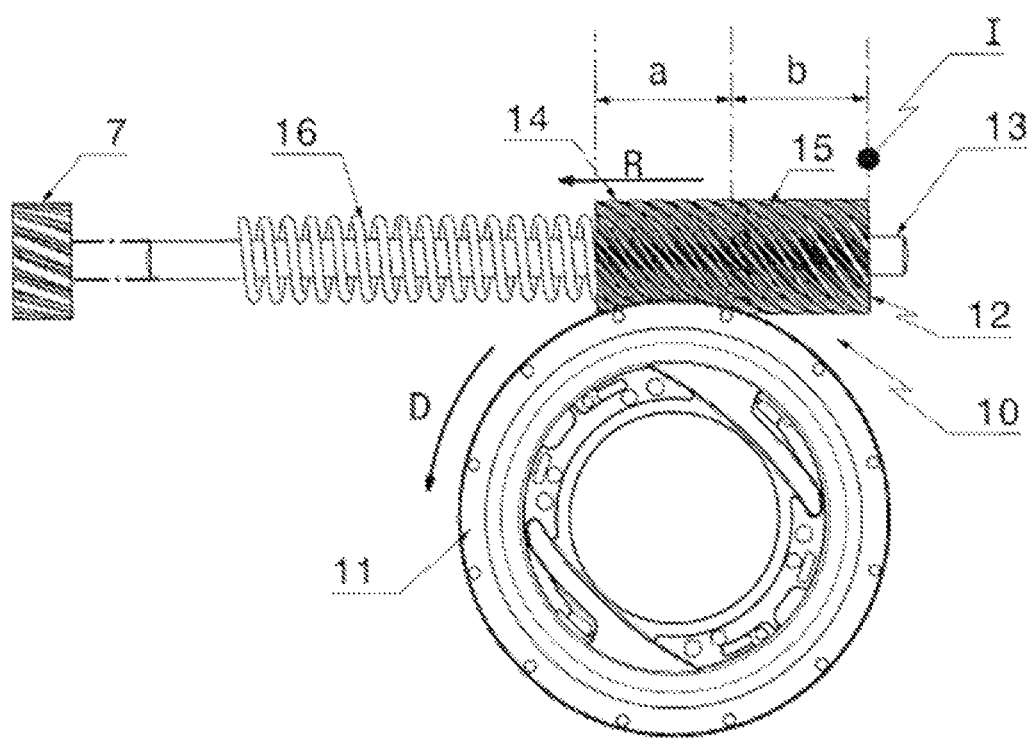
FIG. 6 is a schematic illustration of the worm drive of the belt tightening drive according to FIG. 1 in a first engaged position of the worm with the driven wheel according to a second exemplary embodiment.
Figure 7:
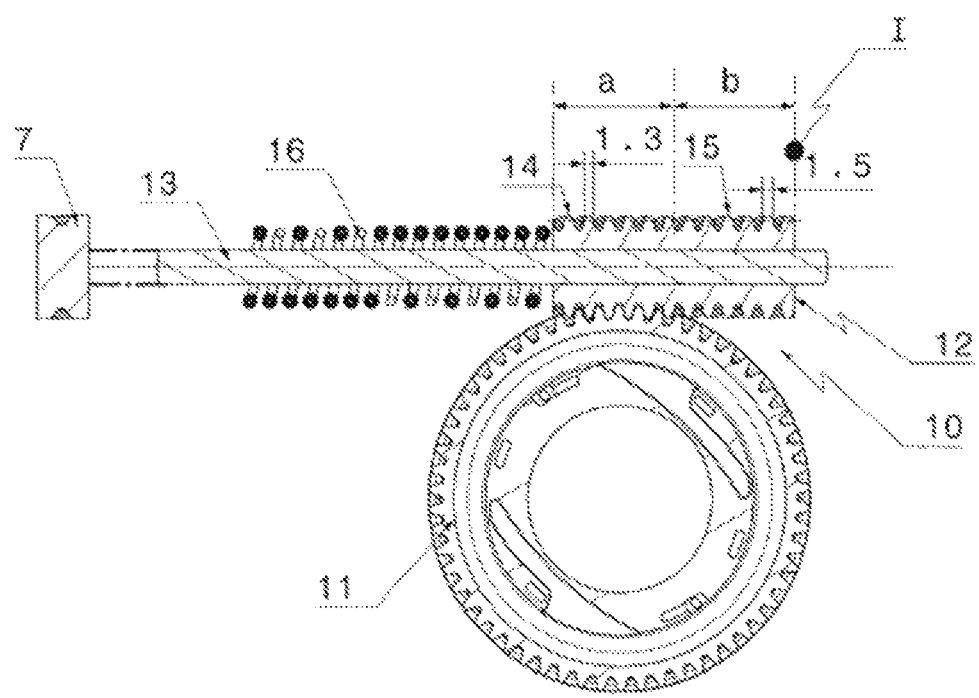
FIG. 7 is a schematic illustration of the worm drive of the belt tightening drive according to FIG. 6 in a second engaged position of the worm with the driven wheel.

The FIGS. 6 and 7 also show a worm drive 10 with a first toothed section a and a second toothed section b with different toothed geometries 14 and 15. The first toothed geometry 14 may be equivalent to the toothed geometry 14 according to FIGS. 2 and 4, with here however the second toothed geometry 15 being embodied with teeth, with their tooth width being greater than the tooth width of the teeth of the first toothed geometry 14. Here, the tooth width, starting with the tooth width of the first toothed geometry 14, continuously increases at the transition between the two toothed geometries 14 and 15 towards a final value. For example, FIG. 7 comprises a first toothed section 14, with its teeth showing a tooth width of 1.3 mm and a second toothed section 15, which starting at this tooth width of 1.3 increases to an end value of 1.5 mm.

The FIGS. 6 and 7 show the worm 12 arranged on the spindle shaft 13 in a position I, in which, as already described above, the first toothed geometry 14 is embodied for achieving a rapid reduction of belt slack such that a low transmission of the worm drive 10 is achieved.

A load at the driven side causes a force at the driven wheel 11 acting in the direction D, which causes the worm 12 to be axially displaced on the spindle shaft 13 in the direction R against the spring force of the spring element 16. This way the second toothed section 15 comprising the wider teeth is made to engage the teeth of the driven wheel 11. Consequently, under increasing load at the driven wheel 11, a clamping effective connection develops between the driven wheel 11 and the worm 12 and thus the torque is increased which can be applied by the driven wheel 11. When the width of the teeth of the second toothed geometry 15 is selected appropriately, here a self-blocking of the worm drive 10 can also be achieved.

Figure 8:
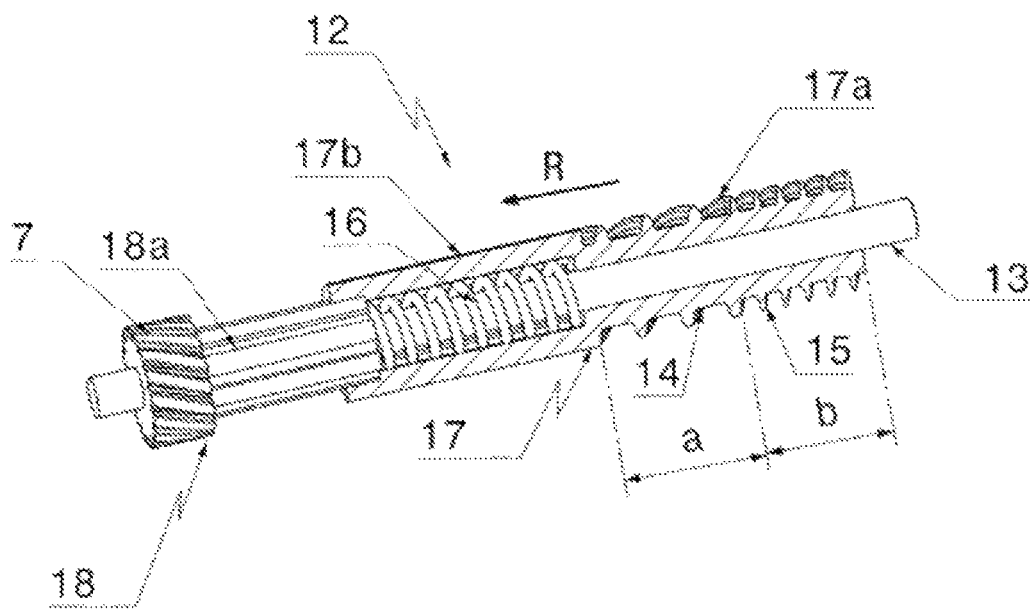
FIG. 8 is a line drawing evidencing a perspective cross-section of a worm arranged on a spindle shaft in its first position I according to the belt tightening drive according to FIG. 1.
Figure 9:
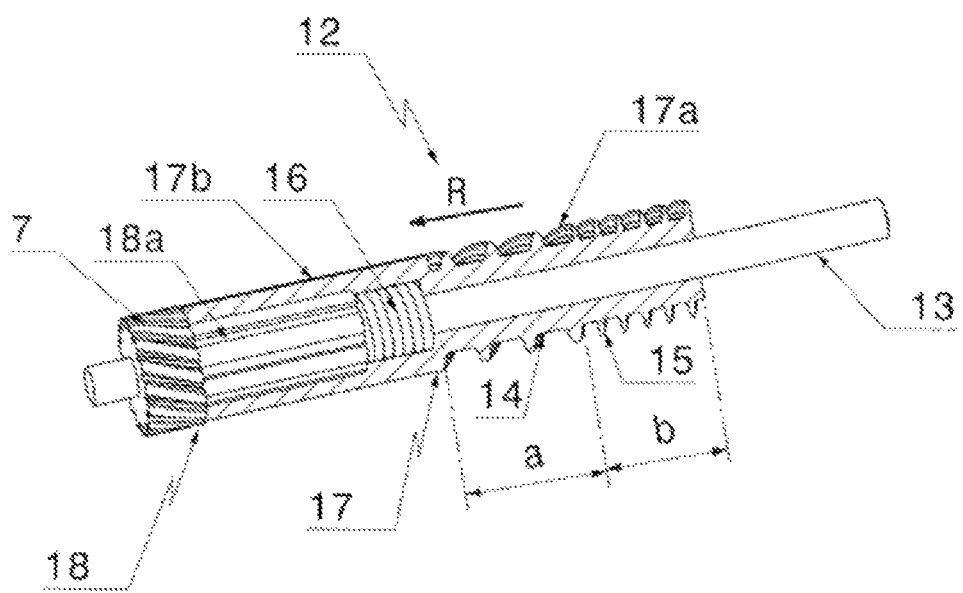
FIG. 9 is a schematic illustration of the worm arranged on a spindle shaft according to FIG. 8 in a position axially displaced out of the position I.

The FIGS. 8 and 9 show a design of a worm 12 arranged on a spindle shaft 13. According to FIG. 8 the worm 12 is in a position I, in which the first toothed section a engages the driven wheel 11, while in the position of the worm 12 according to FIG. 9 it is axially displaced on the spindle shaft 13 in the direction R against the spring force of the spring element 16.

The worm 12 shown in the two FIGS. 8 and 9 comprises a worm element 17, which carries the two toothed sections a and b with the first and second toothed geometries 14 and 15 as well as a driven element 18, which is arranged on the spindle shaft 13 in a torque-proof fashion and which shows the worm wheel 7 of the transmission 5.

The worm element 17 comprises a first part 17a, showing one of the two toothed sections a and b, and a tubular second part 17b adjacent thereto, which accepts telescopically a cylindrical part 18a of the drive element 18. Here, this tubular second part 17b is connected in a torque-proof fashion to this cylindrical part 18a, for example via a rod arranged in the axial direction over a cylindrical part 18a, engaging a contour adjusted thereto and engaging a groove extending in the axial direction.

It is also possible to generate the coupling of the torque of the second part 17b to the cylindrical part 18a not via axially extending rods and corresponding grooves, so that here a purely axial displacement occurs, but to realize it via helically extending rods and grooves. This way, at the time of the axial displacement, a temporarily effective change in transmission can be achieved by way of distortion during the axial displacement.

The spring element 16 is arranged on the spindle shaft 13 inside the tubular second part 17b, supported by the cylindrical part 18a of the drive element 18.

As described above, with an increasing load upon the driven wheel 11, the worm element 17 can be axially displaced on the spindle shaft 13 in the direction of the drive element 18, thus in the direction R against the spring force of the spring element 16. The position of the worm element 17 reached after the displacement is shown in FIG. 9 and is equivalent to the position of the worm 12 according to FIG. 4, for example.

According to the above-described exemplary embodiment a spiral pressure spring is used for the spring element 16. Of course, other spring elements, such as spiral spring elements with tensile effects may be used for the worm 12 or flat springs.

Figure 10:
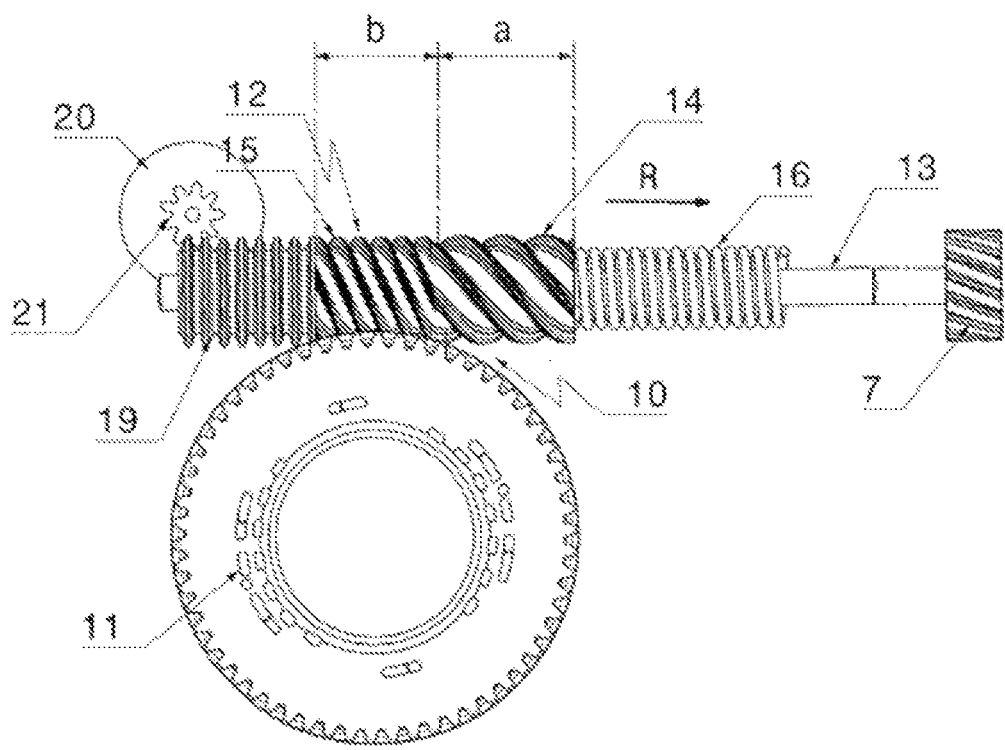
FIG. 10 is a schematic illustration of the worm drive of the belt tightening drive according to FIG. 4 in a first engaged position of the worm with the driven wheel with an actuator in a first embodiment for displacing the worm.
Figure 11:
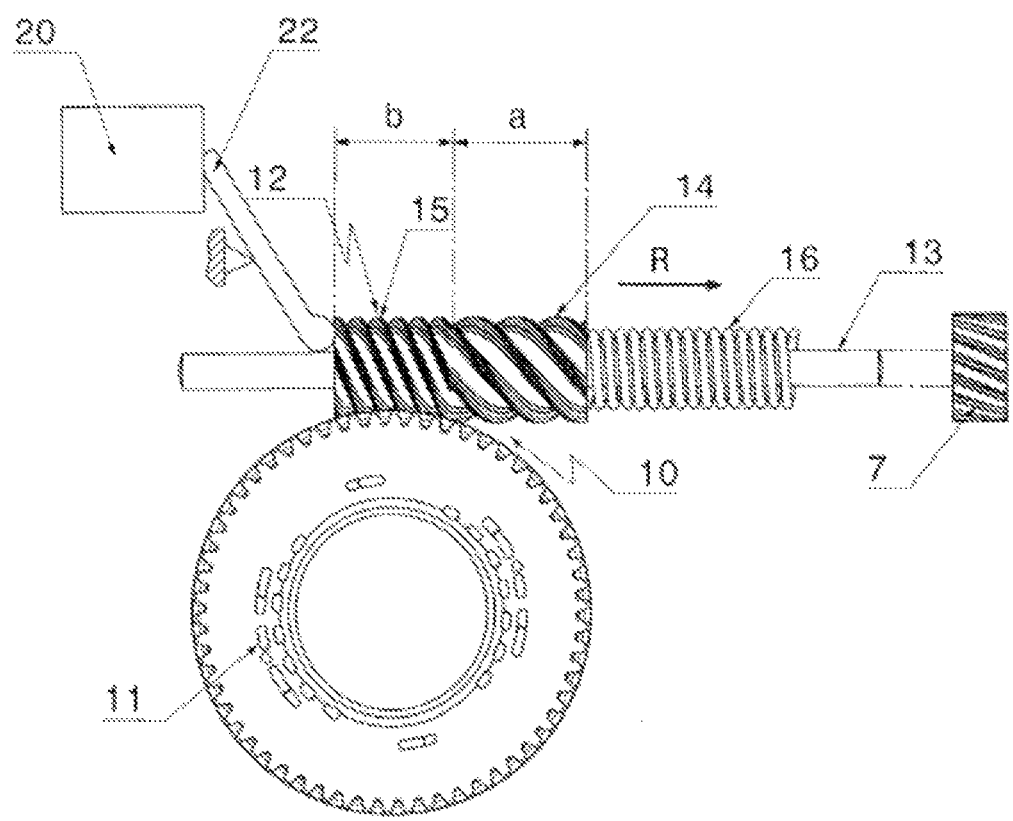
FIG. 11 is a schematic illustration of the worm drive of the belt tightening drive according to FIG. 10 with an actuator in an alternative embodiment for displacing the worm.

In the above-described exemplary embodiments the displacement of the worm 12 occurs depending on the load at the driven side. FIGS. 10 and 11 describe an option to control the displacement of the worm 12 in a targeted fashion independent from the load at the driven wheel 11, between a switching status in which the worm 12 in the first position I engages the first toothed geometry a and a switching status II in which the worm 12 in the second position II engages the second toothed geometry b.

For this purpose, in FIGS. 10 and 11 an actuator 20 is provided, by which a displacement of the worm 12 is caused out of a first position I into the second position II, from which, again independent from the actuator 20, the worm 12 is pushed back into the first position I by the spring element 16.

The embodiment of the worm drive 10 in these FIGS. 10 and 11 is equivalent to the one according to FIG. 4.

According to FIG. 10, here a motor unit or an electric engine is provided as the actuator 20, which via a toothed wheel 21 formed as a spur wheel engages a contour 19 of a toothed rack arranged at the end of the worm 12. This contour of the toothed rack 19 is embodied in the form of circumferential grooves, so that the worm 12 can freely rotate, however when the toothed wheel 21, in the state electrified by the motor unit 20, it is axially displaced on the spindle axis 13 against the spring force of the spring element 16 out of the first position I into the second position II, as shown in FIG. 10. When the motor unit 20 is not electrified the worm 12 is again pushed back into the first position by the spring force of the spring element 16.

The actuator 20 of the worm drive 10 according to FIG. 11 is embodied as a magnetic system with a rocker switch 22 pivotal between two switch positions. In an activated magnetic system 20 the rocker switch 22 is pivoted into a first position, by which the worm 12 is pushed by this rocker switch 22 into a first position II against the spring force of the spring element 16, as shown in FIG. 11. In a not-activated magnetic system 20 the rocker switch 22 falls back into a second switch position, so that due to the spring force of the spring element 16 the worm 12 is pushed back into its first position 1.

The displacement of the worm via an actuator 20 can also be performed by the worm drive 10 in the embodiment according to FIGS. 6 and 7.

Further, it is also possible to embody the actuators 20 according to the FIGS. 10 and 11 such that the spring element 16 can be waived, and the displacement of the worm 12 between the two positions I and II is performed in both directions exclusively by the actuator 20.

Finally, the worm drive 10 can also be embodied such that the worm 12 is connected in a torque-proof fashion to the spindle shaft 13, thus can only be displaced together with this spindle shaft 13. In this case, of course, a stop not connected to the spindle shaft 13 is not required for the spring element 13.

LIST OF REFERENCE NUMBERS

1 Belt tightening drive
2 Seat belt
3 Drive unit, electric engine
4 Motor shaft of the electric engine 3
5 Transmission
6 Worm of the transmission 5
7 Worm wheel of the transmission 5
10 Worm drive
11 Driven wheel, worm wheel
12 Worm
13 Spindle shaft
14 First toothed section of the worm 12
15 Second toothed section of the worm 12
16 Spring element, pressure spring
17 Worm element
18 Drive element
19 Contour of the toothed rack of the worm 12
20 Actuator, motor unit, magnetic system
21 Toothed wheel
22 Rocker switch The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A belt tightening drive for tightening a seat belt that can be wound about a winding shaft, comprising:
   (i) a spindle shaft driven by a drive unit, and
   (ii) a worm drive with a worm supported in a torque-proof fashion on the spindle shaft and a driven wheel engaged therewith and supported in a torque-proof fashion on the winding shaft, wherein (a) the worm comprises a first toothed section with a first toothed geometry, with in the first position of the worm the first toothed section engages the driven wheel, (b) the worm comprises at least one second toothed section with a second toothed geometry following the first toothed section, with the first and the second toothed geometries being designed differently, and (c) depending on an axial force applied upon the worm, an axial displacement of the worm occurs between a first position, in which the worm engages the driven wheel via the first toothed section, and a second position, in which the worm engages the driven wheel via second toothed section of the worm.

2. The belt tightening drive of claim 1, wherein the worm is arranged on the spindle shaft in a displaceable fashion between the first position and the second position, allowing for a relative translation.

3. The belt tightening drive of claim 2, wherein the second toothed geometry shows a lower pitch than the first toothed geometry.

4. The belt tightening drive of claim 2, wherein the first toothed geometry of the worm has a first pitch and the second toothed geometry has a second pitch, wherein the value of the second pitch represents an integral divisor of the value of the first pitch.

5. The belt tightening drive of claim 1, further comprising wherein a spring element is provided, which pre-stresses the worm in the direction towards the first position.

6. The belt tightening drive of claim 5, wherein the axial force applied upon the worm is generated by a load acting upon the driven wheel, wherein, depending on the load acting at the driven wheel, an axial displacement of the worm out of the first position into the second position against the spring force of the spring element is caused.

7. The belt tightening drive of claim 1, further comprising wherein an actuator is provided to generate the axial force applied upon the worm.

8. The belt tightening drive of claim 7, wherein the actuator and the spring element are designed such that the worm, depending on an axial force generated by the actuator, is displaced out of the first position into the second position against the spring force of the spring element.

9. The belt tightening drive of claim 7, wherein the actuator is designed as a motor unit with a toothed wheel and the worm comprises a contour of a toothed rack effectively connected to the toothed wheel.

10. The belt tightening drive of claim 9, wherein the second toothed geometry continuously increases, beginning with a tooth strength equivalent to the tooth strength of the first toothed geometry.

11. The belt tightening drive of claim 7, wherein the actuator is designed as a magnetic system with a rocker switch pivotal between two switch positions, with in the activated magnetic system the rocker switch being effectively connected to the worm.

12. The belt tightening drive of claim 1, wherein the first toothed geometry of the worm has a first pitch and the second toothed geometry of the worm has a second pitch, wherein the first pitches and the second pitch show different values.

13. The belt tightening drive of claim 1, wherein a continuous transition is provided between the first and the second toothed geometry.

14. The belt tightening drive of claim 1, wherein the second toothed geometry being designed with a larger tooth strength than the first toothed geometry.

15. The belt tightening drive of claim 1, wherein the toothed geometry of the driven wheel is designed spherically.

16. The belt tightening drive of claim 1, wherein the worm is designed with a worm element comprising the first and the second toothed section arranged in a displaceable fashion on the spindle shaft, and a drive element, connected in a torque-proof fashion to the spindle shaft, with the worm element being rotationally coupled to the drive element and a spring element being arranged between the worm element and the drive element.

* * * * *